(12) United States Patent
Hung

(10) Patent No.: US 7,815,155 B2
(45) Date of Patent: Oct. 19, 2010

(54) SUCTION DEVICE AND SUPPORTING DEVICE HAVING THE SAME

(75) Inventor: Kuang-Hui Hung, Taipei (TW)

(73) Assignee: Lite-On Technology Corp., Taipei (TW)

( * ) Notice: Subject to any disclaimer, the term of this patent is extended or adjusted under 35 U.S.C. 154(b) by 462 days.

(21) Appl. No.: 11/976,343

(22) Filed: Oct. 24, 2007

(65) Prior Publication Data

US 2009/0108153 A1   Apr. 30, 2009

(51) Int. Cl.
*A45D 42/14* (2006.01)
*F16B 47/00* (2006.01)

(52) U.S. Cl. .................. 248/205.5; 248/362

(58) Field of Classification Search ............. 248/205.5, 248/205.6, 205.7, 205.8, 206.1, 206.2, 363, 248/362

See application file for complete search history.

(56) References Cited

U.S. PATENT DOCUMENTS 3,765,638 A * 10/1973 Harrison .................... 248/363

| | | | | |
|---|---|---|---|---|
| 7,092,521 B2 * | 8/2006 | Wang | ......................... | 379/455 |
| 7,303,171 B1 * | 12/2007 | Chen | ....................... | 248/184.1 |
| 7,469,868 B2 * | 12/2008 | Bury | ....................... | 248/205.8 |
| 7,607,622 B2 * | 10/2009 | Carnevali | ................. | 248/205.8 |
| 2006/0284043 A1 * | 12/2006 | Paradise et al. | ............. | 248/362 |

* cited by examiner

*Primary Examiner*—Anita M King
(74) *Attorney, Agent, or Firm*—Rosenberg, Klein & Lee

(57) ABSTRACT

A suction device includes a sucking disc disposed under an upright sleeve, a connecting seat disposed in the sleeve and connected to the sucking disc, and an elongate operating block mounted slidably on the sleeve. The operating block is formed with a cam surface biased to contact a follower portion of the connecting seat. When the operating block is moved relative to the sleeve from a non-sucking position, where the follower portion engages a second positioning portion of the operating block, to a sucking position, where the follower portion engages a first positioning portion of the operating block, the cam surface pushes the connecting seat to move away from a supporting surface, thereby forming a vacant space between the sucking disc and the supporting surface.

15 Claims, 6 Drawing Sheets

SUCTION DEVICE AND SUPPORTING DEVICE HAVING THE SAME

BACKGROUND OF THE INVENTION

1. Field of the Invention

The invention relates to a suction device, more particularly to a suction device that is repositionable, and a supporting device having the same.

2. Description of the Related Art

FIG. 1 illustrates a conventional supporting device 9 disclosed in U.S. Pat. No. 7,092,521. The conventional supporting device 9 includes: a hollow base 912; a sleeve 911 extending upwardly from the center of the top of the base 912 and having an upper end coupled to a supporting rod 95 that has a clamping end capable of clamping a mobile phone (not shown); a sucking member 92 having a flexible disc body 922 disposed under the base 912, and a tubular connecting rod 921 connected to a central portion of the disc body 922 and extending upwardly through the base 912 and into the sleeve 911; and an operating member 93 disposed outwardly of the sleeve 911 and having an operating plate portion 931, and two connecting arm portions 932 connected to the operating plate portion 931. Each connecting arm portion 932 of the operating member 93 has a pivot end 933 in the form of a cam abutting against a top surface 9121 of the base 912 and sleeved rotatably on a corresponding one of opposite ends of a pivot rod 94 that extends through two aligned vertical slide slots 913 in the sleeve 911 (only one is shown) and the connecting rod 921, and that is movable vertically relative to the sleeve 911. A coil spring 96 is sleeved on the connecting rod 921, and is disposed between the base 912 and the disc body 922 for biasing the base 912 to move upwardly.

In such a configuration, during the pivoting movement of the operating member 93, the pivot ends 933 of the connecting arm portions 932 of the operating member 93 are always in contact with the top surface 9121 of the base 912, thereby resulting in wearing of the top surface 9121 of the base 912 after a long period of use. Due to wearing of the top surface 9121 of the base 912, the supporting device 9 cannot be accurately and stably positioned in the sucking state.

SUMMARY OF THE INVENTION

Therefore, the object of the present invention is to provide a repositionable suction device, and a supporting device having the same that can be stably positioned on a supporting surface.

According to one aspect of the present invention, a suction device comprises:

an upright sleeve having a looped surrounding wall formed with two aligned openings opposite to each other in a first direction;

a flexible sucking disc disposed under the sleeve and having a peripheral portion that is adapted to be attached sealingly to a supporting surface and that abuts against the sleeve, and a central portion connected integrally to the peripheral portion and adapted to be spaced apart from the supporting surface;

a connecting seat disposed in the sleeve, and having a base connected to the central portion of the sucking disc, a follower portion, and a through hole disposed between the base and the follower portion; and an elongate operating block mounted slidably on the sleeve, and having opposite first and second operating end portions extending respectively and outwardly of the sleeve through the openings in the looped surrounding wall, and an intermediate neck portion interconnecting the first and second operating end portions and extending through the through hole in the connecting seat, the intermediate neck portion being formed with a cam surface biased to contact the follower portion of the connecting seat, the cam surface having a first positioning portion, and a second positioning portion nearer to the base of the connecting seat than the first positioning portion.

The operating block is operable so as to move relative the sleeve between a non-sucking position, where the follower portion of the connecting seat engages the second positioning portion of the cam surface of the intermediate neck portion of the operating block, and a sucking position, where the follower portion of the connecting seat engages the first positioning portion of the cam surface of the intermediate neck portion of the operating block such that the connecting seat is pushed by the intermediate neck portion of the operating block to move away from the supporting surface, thereby forming a vacant space between the central portion of the flexible sucking disc and the supporting surface.

According to another aspect of the present invention, there is provided a supporting device adapted for an electronic device. The supporting device comprises:

a suction device including an upright sleeve having a looped surrounding wall formed with two aligned openings opposite to each other in a first direction, a flexible sucking disc disposed under the sleeve and having a peripheral portion that is adapted to be attached sealingly to a supporting surface and that abuts against the sleeve, and a central portion connected integrally to the peripheral portion and adapted to be spaced apart from the supporting surface, a connecting seat disposed in the sleeve, and having a base connected to the central portion of the sucking disc, a follower portion, and a through hole disposed between the base and the follower portion, and an elongate operating block mounted slidably on the sleeve, and having opposite first and second operating end portions extending respectively and outwardly of the sleeve through the openings in the looped surrounding wall, and an intermediate neck portion interconnecting the first and second operating end portions and extending through the through hole in the connecting seat, the intermediate neck portion being formed with a cam surface biased to contact the follower portion of the connecting seat, the cam surface having a first positioning portion, and a second positioning portion nearer to the base of the connecting seat than the first positioning portion;

a supporting member having an inserting end portion inserted into one end of the sleeve of the suction device distal from the supporting surface, and a connecting end portion opposite to the inserting end portion; and a mounting unit connected to the connecting end portion of the supporting member and adapted for mounting the electronic device thereon;

The operating block is operable so as to move relative to the sleeve between a non-sucking position, where the follower portion of the connecting seat engages the second positioning portion of the cam surface of the intermediate neck portion of the operating block, and a sucking position, where the follower portion of the connecting seat engages the first positioning portion of the cam surface of the intermediate neck portion of the operating block such that the connecting seat is pushed by the intermediate neck portion of the operating block to move away from the supporting surface, thereby forming a vacant space between the central portion of the flexible sucking disc and the supporting surface.

BRIEF DESCRIPTION OF THE DRAWINGS

Other features and advantages of the present invention will become apparent in the following detailed description of the preferred embodiment with reference the accompanying drawings, of which.

DETAILED DESCRIPTION OF THE PREFERRED EMBODIMENT

Figure 2:
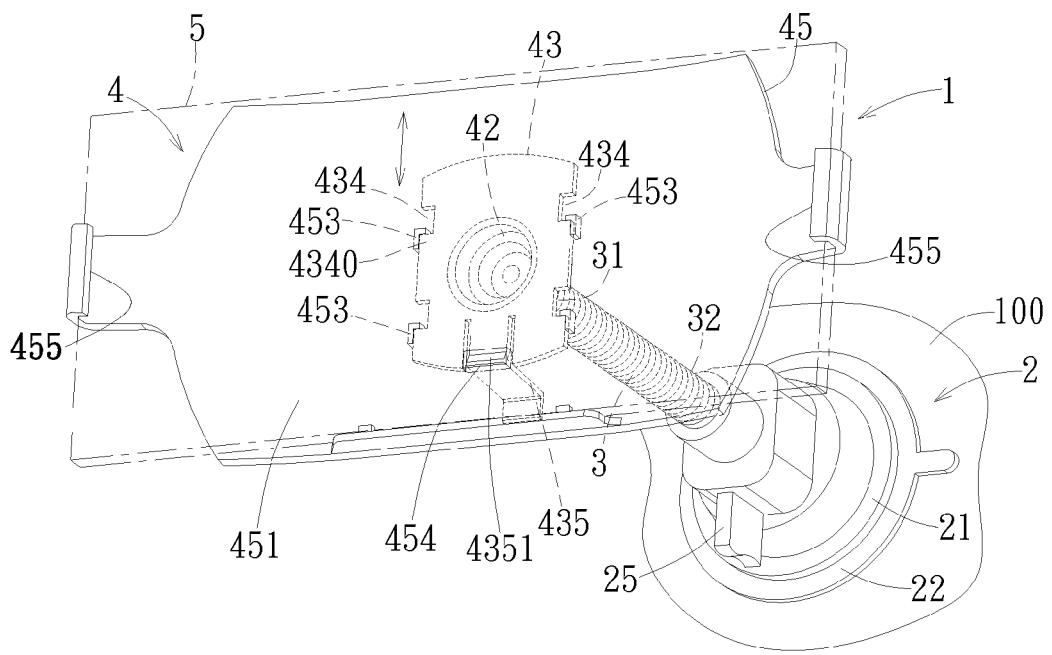
FIG. 2 is a perspective view showing the preferred embodiment of a supporting device according to the present invention.

Referring to FIG. 2, the preferred embodiment of a repositionable supporting device 1 adapted for an electronic device 5 according to the present invention is shown to include a suction device 2, a supporting member 3, and a mounting unit 4. In this embodiment, the electronic device 5 can be a mobile phone, a PDA, or a satellite navigation device.

Referring further to FIGS. 3, 3a, 4 and 5, the suction device 2 includes an upright sleeve 21, a flexible sucking disc 22, a connecting seat 23, and an elongate operating block 25.

Figure 3:
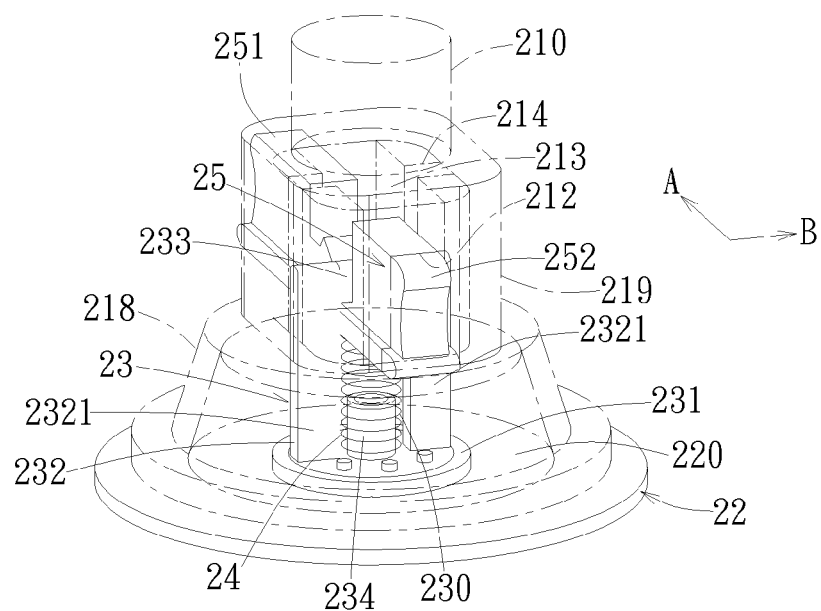
FIG. 3 is a perspective view showing a suction device of the preferred embodiment.
Figure 3A:
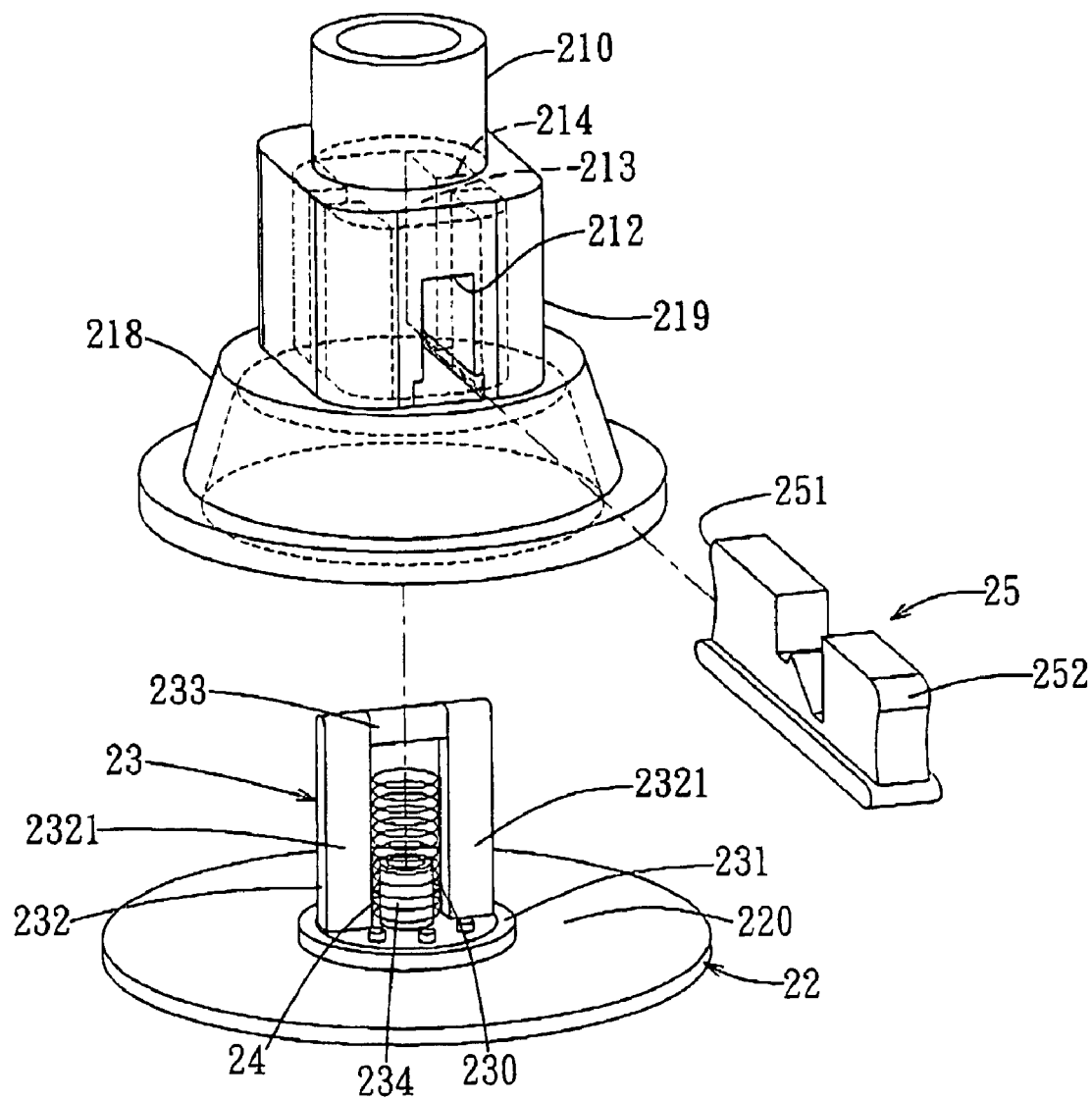
FIG. 3a is a partly exploded perspective view showing the suction device of the preferred embodiment.
Figure 4:
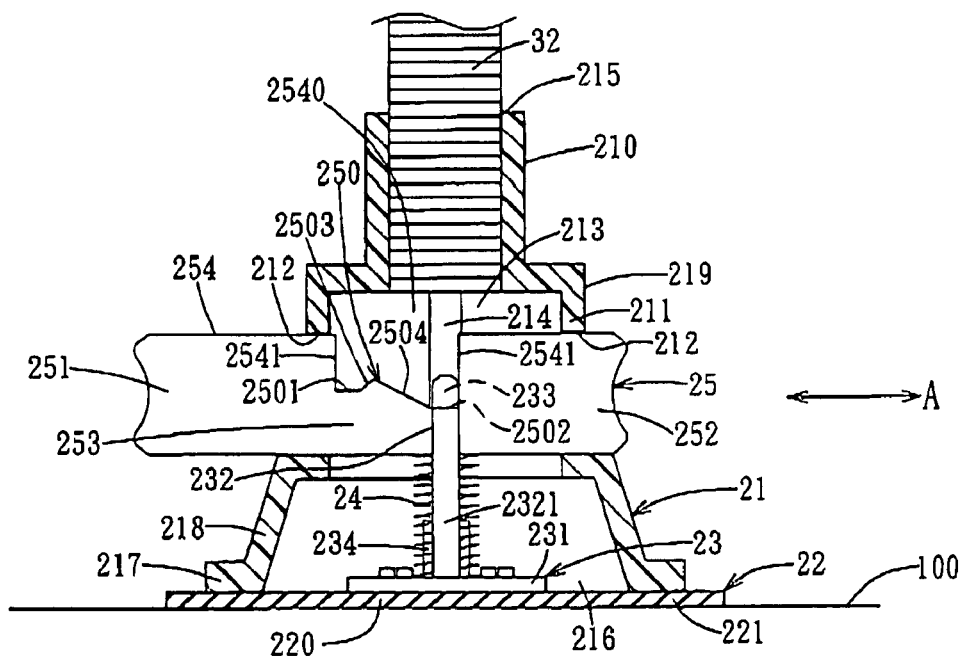
FIG. 4 is a schematic partly sectional view showing the suction device of the preferred embodiment when in a non-sucking state.

In this embodiment, the sleeve 21 has an open first end 216, an open second end 215 opposite to the first end 216, a frusto-conical first end portion 218 adjacent to the first end 216 and having a diameter that increases gradually toward the first end 216, a cylindrical second end portion 210 adjacent to the second end 215 and opposite to the first end portion 218, and a rectangular intermediate portion 219 interconnecting the first and second end portions 219, 210 (see FIG. 4). The sleeve 21 further has an annular flange 217 that extends radially and outwardly from the first end 216. The intermediate portion 219 of the sleeve 21 has a looped surrounding wall 211 (see FIG. 5) formed with two aligned openings 212 opposite to each other in a first direction (A). In this embodiment, the intermediate portion 219 of the sleeve 21 is configured with a first inner passage 213 in spatial communication with the openings 212 in the looped surrounding wall 211, and a second inner passage 214 orthogonal to and in spatial communication with the first inner passage 213, as best shown in FIG. 3a.

The sucking disc 22 is disposed under the sleeve 21, and has a peripheral portion 221 that is adapted to be attached sealingly to a supporting surface 100, such as a table surface or a wall surface, and that is pressed against the supporting surface 100 by the annular flange 217 of the sleeve 21, and a central portion 220 connected integrally to the peripheral portion 221 and adapted to be spaced apart from the supporting surface 100.

The connecting seat 23 is disposed in the sleeve 21, and has a base 231 disposed in the first end portion 218 of the sleeve 21 and connected to the central portion 220 of the sucking disc 22, a follower portion disposed in the intermediate portion 219 of the sleeve 21, and a through hole 230 disposed between the base 231 and the follower portion. In this embodiment, the connecting seat 23 further has a U-shaped frame 232. The U-shaped frame 232 has two parallel side frame portions 2321 opposite to each other in a second direction (B) perpendicular to the first direction (A), connected fixedly to the base 231, and extending from the base 231 toward the intermediate portion 219 of the sleeve 21 such that the second inner passage 214 in the intermediate portion 219 of the sleeve 21 permits extension of corresponding end portions of the side frame portions 2321 thereinto. The U-shaped frame 232 further has a connecting frame portion 233 interconnecting the side frame portions 2321, serving as the follower portion, and disposed in the second inner passage 214 in the intermediate portion 219 of the sleeve 21, as shown in FIG. 3. The U-shaped frame 232 cooperates with the base 231 to define the through hole 230 in the connecting seat 23 (see FIG. 3a). The connecting seat 23 further has a spring-positioning rod 234 disposed in the first end portion 218 of the sleeve 21 and extending from the base 231 toward the connecting frame portion 233 of the U-shaped frame 232 and into the through hole 230, as shown in FIG. 3.

The operating block 25 is mounted slidably on the intermediate portion 219 of the sleeve 21, and has opposite first and second operating ends 251, 252 extending respectively and outwardly of the intermediate portion 219 of the sleeve 21 through the openings 212 in the looped surrounding wall 211, and an intermediate neck portion 253 interconnecting the first and second operating end portions 251, 252 and extending through the through hole 230 in the connecting seat 23. The intermediate neck portion 253 is formed with a cam surface 250 biased to contact the follower portion (i.e., the connecting frame portion 233 of the U-shaped frame 232) of the connecting seat 23 as a result of biasing of a coil spring 24, which is disposed in the first end portion 218 of the sleeve 21, which is sleeved around the spring-positioning rod 234, and which has opposite ends abutting respectively against the operating block 25 and the base 231. In this embodiment, the operating block 25 has a side 254 distal from the base 231 of the connecting seat 23 and formed with a notch 2540 defined by the cam surface 250 and two opposite lateral side walls 2541 flanking the cam surface 250. The cam surface 250 has a first positioning portion 2501 adjacent to the first operating end portion 251, a second positioning portion 2502 adjacent to the second operating end portion 252 and nearer to the base 231 of the connecting seat 23 than the first positioning portion 2501, and two inclined surface portions 2503, 2504, each of which has opposite inner and outer ends. The outer ends of the inclined surface portions 2503, 2504 are connected respectively to corresponding ends of the first and second positioning portions 2501, 2502, while the inner ends of the inclined surface portions 2503, 2504 are interconnected at a position farther away from the base 231 of the connecting seat 23 than the first and second positioning portions 2501, 2502.

The supporting member 3 has an inserting end portion 32 inserted into the second end 215 of the sleeve 21 of the suction device 2, and a connecting end portion 31 opposite to the inserting end portion 32.

Referring further to FIGS. 6 to 9, the mounting unit 4 is connected to the connecting end portion 31 of the supporting member 3, and is adapted for mounting the electronic device 5 thereon (see FIG. 2). In this embodiment, the mounting unit 4 includes a connecting member 40, a pivot plate body 43, and a mounting plate body 45.

Figure 6:
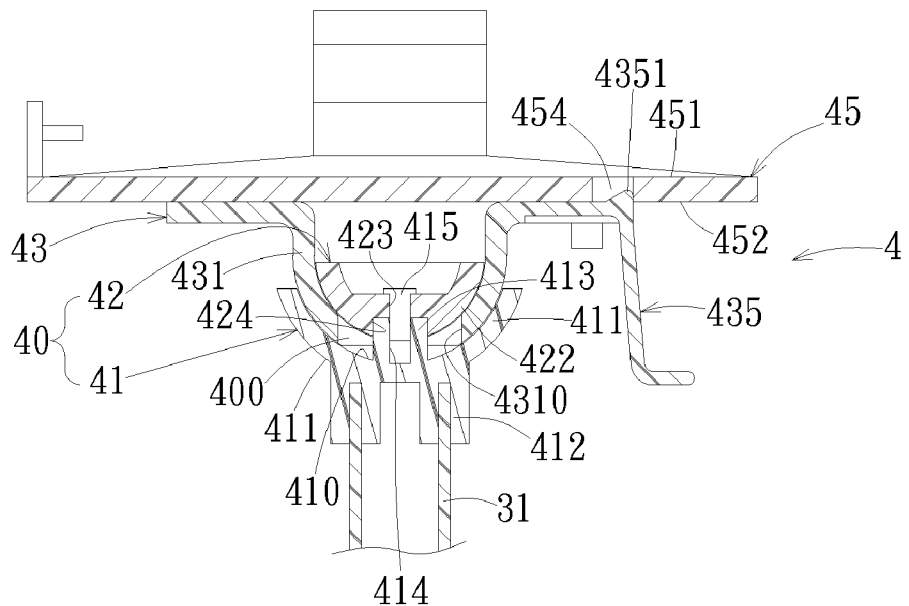
FIG. 6 is a fragmentary schematic partly sectional view showing an assembly of a supporting member and a mounting unit of the preferred embodiment.
Figure 7:
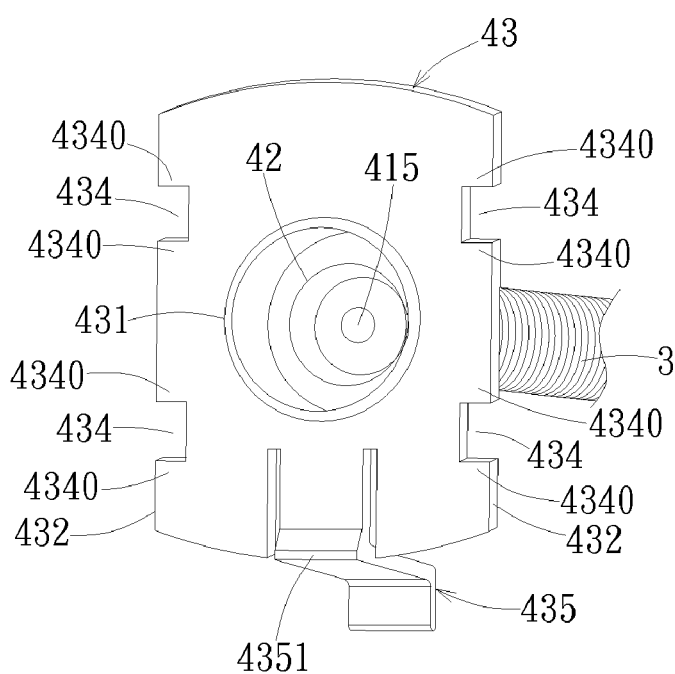
FIG. 7 is a fragmentary perspective view showing an assembly of the supporting member, and a connecting member and a pivot plate body of the mounting unit of the preferred embodiment.
Figure 8:
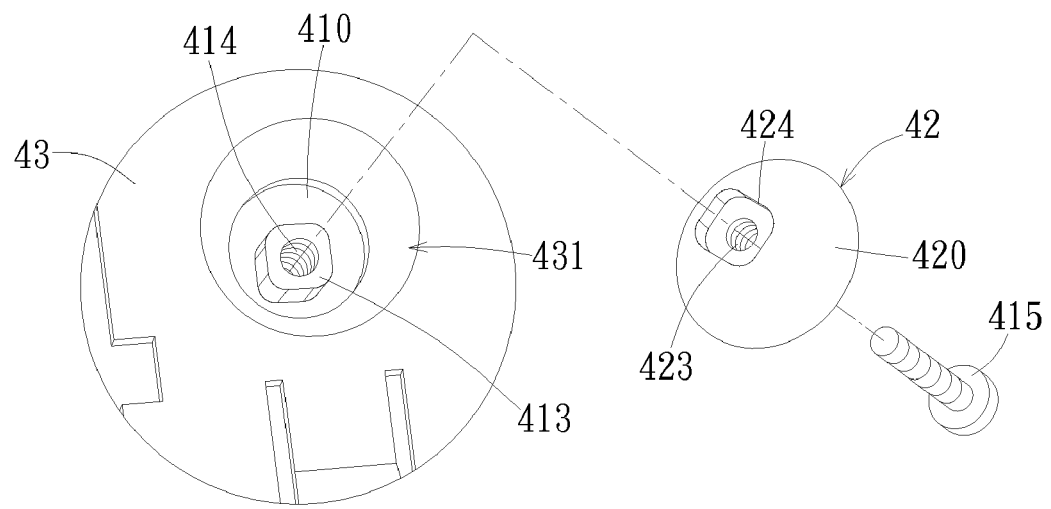
FIG. 8 is a partly exploded, fragmentary perspective view showing the connecting member and the pivot plate body of the mounting unit of the preferred embodiment.

The connecting member 40 is connected to the connecting end portion 31 of the supporting member 3. In this embodiment, the connecting member 40 includes a bowl-shaped first seat body 41 and a bowl-shaped second seat body 42. The first seat body 41 has a convex surface 411 formed with a first protrusion 412 that extends from a center of the convex surface 411 and that is connected fixedly to the connecting end portion 31 of the supporting member 3, and a concave surface 410 opposite to the convex surface 411 and formed with a second protrusion 413 that extends from a center of the concave surface 410 and that is opposite to the first protrusion 412. The second seat body 42 is disposed in the first seat body 41, and is connected to the second protrusion 413 of the first seat body 41 such that an annular mounting space 400 is formed between the first and second seat bodies 41, 42. It is noted that, as shown in FIGS. 6 and 8, the second protrusion 413 of the first seat body 41 is rectangular in cross section, and has a threaded hole 414, and that the second seat body 42 has a convex surface 420 adjacent to the concave surface 410 of the first seat body 41 and formed with an engaging recess 424 engaging one end of the second protrusion 413, and a threaded hole 423 aligned with the threaded hole 414 in the second protrusion 413 of the first seat body 41 and in spatial communication with the engaging recess 424. A screw fastener 415 engages the threaded hole 423 in the second seat body 42 and the threaded hole 414 in the second protrusion 413 of the first seat body 41, thereby connecting the second seat body 42 to the first seat body 41.

As shown in FIG. 6, the pivot plate body 43 has a bowl-shaped central portion 431 that is formed with a central opening 4310 to permit extension of the second protrusion 413 of the first seat body 41 of the connecting member 40 therethrough and that is disposed rotatably in the annular mounting space 400 and between the first and second seat bodies 41, 42 such that the pivot plate body 43 is pivotable relative to the connecting member 40 about the second protrusion 413 of the first seat body 41 of the connecting member 40. As particularly shown in FIG. 7, the pivot plate body 43 further has opposite lateral sides 432 each formed with a plurality of notches 434. Each notch 434 is defined between two adjacent corner portions 4340 facing each other. Furthermore, the pivot plate body 43 has a generally L-shaped resilient operating member 435 formed with a projection 4351.

Figure 9:
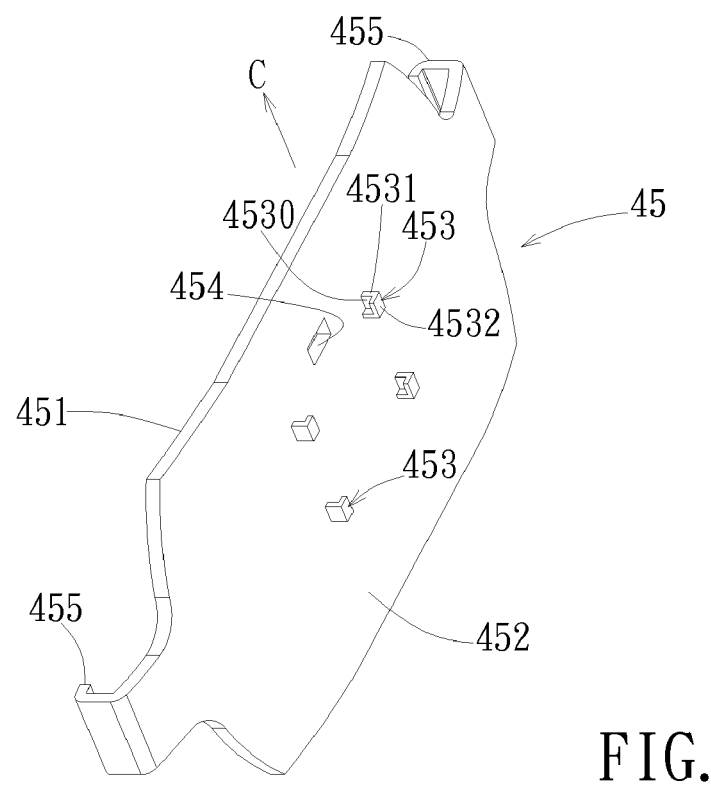
FIG. 9 is a perspective view showing a mounting plate body of the mounting unit of the preferred embodiment.

As particularly shown in FIG. 9, the mounting plate body 45 has a first surface 452 facing the pivot plate body 43 and formed with a plurality of corner-engaging members 453 each engaging detachably a corresponding one of the corner portions 4340 of the pivot plate body 43, and a second surface 451 opposite to the first surface 452 and adapted for mounting the electronic device 5 thereon by using opposite hook-shaped members 455 on opposite lateral sides of the mounting plate body 45. In this embodiment, each corner-engaging member 453 has an L-shaped plate portion 4531 extending from the first surface 452 of the mounting plate body 45, and an outer plate portion 4532 extending from the L-shaped plate portion 4531 and parallel to and spaced apart from the first surface 452 so as to define a corner-receiving space 4530 among the L-shaped plate portion 4531, the outer plate portion 4532 and the first surface 452. The corner-receiving spaces 4530 in the corner-engaging members 453 receive respectively corresponding ones of the corner portions 4340 of the pivot plate body 43, and are open in a third direction (C) parallel to the first surface 452 such that the corresponding ones of the corner portions 4340 of the pivot plate body 43 are movable relative to the mounting plate body 45 in the third direction (C) to thereby separate from the corner-engaging members 453, respectively, so as to allow removal of the mounting plate body 45 from the pivot plate body 43. Furthermore, the first surface 452 of the mounting plate body 45 is formed with an engaging groove 454 that engages detachably the projection 4351 of the operating member 435 of the pivot plate body 43 for preventing separation of the corner-engaging members 453 from the corresponding ones of the corner portions 4340 of the pivot plate body 43, respectively, as shown in FIG. 2.

Figure 5:
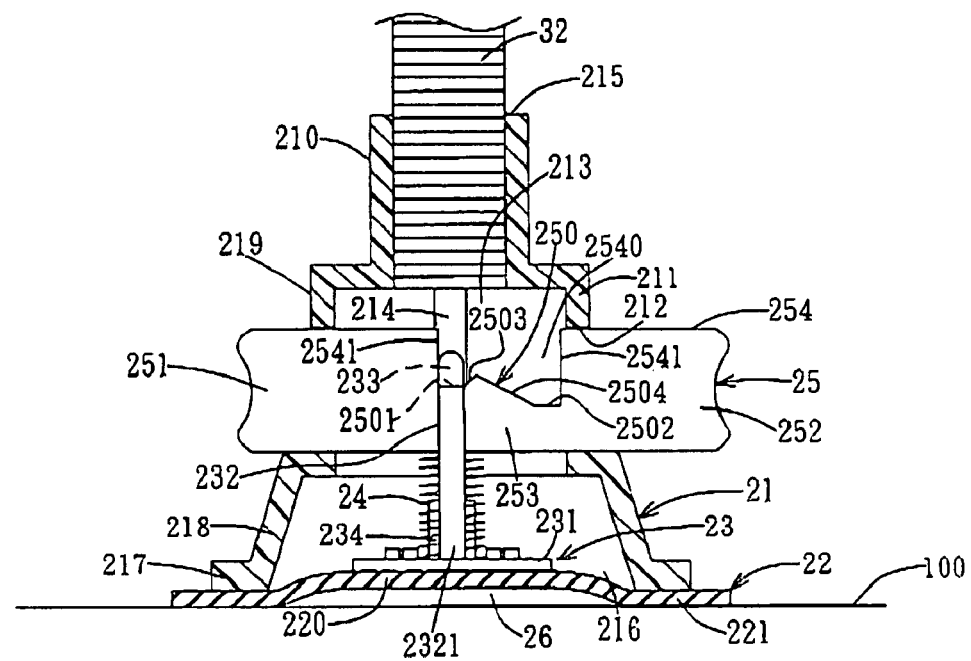
FIG. 5 is a schematic partly sectional view showing the suction device of the preferred embodiment when in a sucking state.

In actual operation, the operating block 25 is operable so as to move relative to the sleeve 21 between anon-sucking position, where the follower portion (i.e., the connecting frame portion 233 of the U-shaped frame 232) of the connecting seat 23 engages the second positioning portion 2502 of the cam surface 250 of the intermediate neck portion 253 of the operating block 25, as shown in FIG. 4, and a sucking position, where the follower portion of the connecting seat 23 engages the first positioning portion 2501 of the cam surface 250 of the intermediate neck portion 253 of the operating block 25 such that the connecting seat 23 is pushed by the intermediate neck portion 253 of the operating block 25 to move away from the supporting surface 100, thereby forming a vacant space 26 between the central portion 220 of the flexible sucking disc 22 and the supporting surface 100, as shown in FIG. 5.

Figure 1:
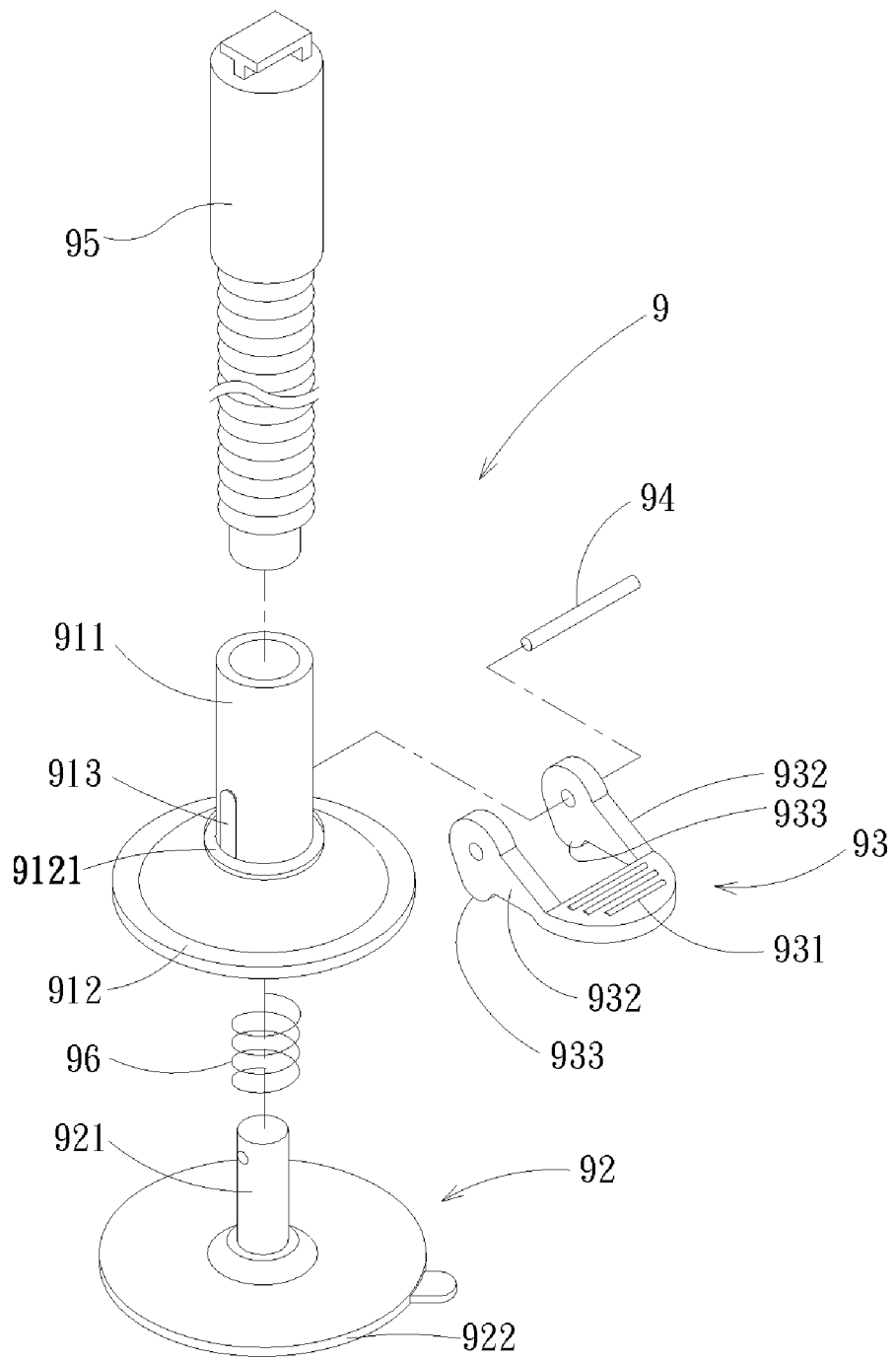
FIG. 1 is an exploded perspective view showing a conventional supporting device.

In this invention, since the suction device 2 can be easily switched between a non-sucking state and a sucking state by operation of the operating block 25, and since the intermediate neck portion 253 is disposed in the sleeve 21, frictional wearing of the top surface 1121 of the base 112 (see FIG. 1) as encountered in the prior art can be avoided. Furthermore, when the suction device 2 is in the sucking state, due to the presence of the first positioning portion 2501 and the inclined surface portion 2503 of the car surface 250 of the operating block 25, the connecting seat 23 can be stable positioned in the sleeve 21 so as to maintain the vacant space 26 when the suction device 2 is in the sucking state, thereby enabling the supporting device 1 of the present invention to be positioned stably on the supporting surface 100. Moreover, the mounting unit 4 can be easily assembled and disassembled.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:
1. A suction device comprising:
an upright sleeve having a looped surrounding wall formed with two aligned openings opposite to each other in a first direction;
a flexible sucking disc disposed under said sleeve and having a peripheral portion that is adapted to be attached sealingly to a supporting surface and that abuts against said sleeve, and a central portion connected integrally to said peripheral portion and adapted to be spaced apart from the supporting surface;

a connecting seat disposed in said sleeve, and having a base connected to said central portion of said sucking disc, a follower portion, and a through hole disposed between said base and said follower portion; and an elongate operating block mounted slidable on said sleeve, and having opposite first and second operating end portions extending respectively and outwardly of said sleeve through said openings in said looped surrounding wall, and an intermediate neck portion interconnecting said first and second operating end portions and extending through said through hole in said connecting seat, said intermediate neck portion being formed with a cam surface biased to contact said follower portion of said connecting seat, said cam surface having a first positioning portion, and a second positioning portion nearer to said base of said connecting seat than said first positioning portion;

wherein said operating block is operable so as to move relative to said sleeve between a non-sucking position, where said follower portion of said connecting seat engages said second positioning portion of said cam surface of said intermediate neck portion of said operating block, and a sucking position, where said follower portion of said connecting seat engages said first positioning portion of said cam surface of said intermediate neck portion of said operating block such that said connecting seat is pushed by said intermediate neck portion of said operating block to move away from the supporting surface, thereby forming a vacant space between said central portion of said flexible sucking disc and the supporting surface.

2. The suction device as claimed in claim 1, wherein said operating block has a side distal from said base of said connecting seat and formed with a notch defined by said cam surface, and two opposite lateral side walls flanking said cam surface, said cam surface further having two inclined surface portions, each of which has opposite inner and outer ends, said outer ends of said inclined surface portions being connected respectively to corresponding ends of said first and second positioning portions, said inner ends of said inclined surface portions being interconnected at a position farther away from said base of said connecting seat than said first and second positioning portions.

3. The suction device as claimed in claim 1, wherein said connecting seat further has a U-shaped frame that has two parallel side frame portions opposite to each other in a second direction perpendicular to the first direction and connected fixedly to said base of said connecting seat, and a connecting frame portion interconnecting said side frame portions and serving as said follower portion of said connecting seat, said U-shaped frame cooperating with said base to define said through hole in said connecting seat.

4. The suction device as claimed in claim 3, wherein said connecting seat further has a spring-positioning rod extending from said base toward said connecting frame portion of said U-shaped frame and into said through hole in said connecting seat, said suction device further comprising a coil spring disposed in said sleeve and sleeved around said spring-positioning rod, said coil spring having opposite ends abutting respectively against said operating block and said base for biasing said cam surface of said operating block to contact said connecting frame portion of said U-shaped frame.

5. The suction device as claimed in claim 3, wherein said sleeve is configured with a first inner passage in spatial communication with said openings in said looped surrounding wall to permit movement of said operating block therein, and a second inner passage orthogonal to and in spatial communication with said first inner passage to permit extension of said connecting frame portion and corresponding end portions of said side frame portions of said U-shaped frame of said connecting seat thereinto.

6. A supporting device adapted for an electronic device, comprising:

a suction device including
an upright sleeve having a looped surrounding wall formed with two aligned openings opposite to each other in a first direction,
a flexible sucking disc disposed under said sleeve and having a peripheral portion that is adapted to be attached sealingly to a supporting surface and that abuts against said sleeve, and a central portion connected integrally to said peripheral portion and adapted to be spaced apart from the supporting surface,
a connecting seat disposed in said sleeve, and having a base connected to said central portion of said sucking disc, a follower portion, and a through hole disposed between said base and said follower portion, and
an elongate operating block mounted slidably on said sleeve, and having opposite first and second operating end portions extending respectively and outwardly of said sleeve through said openings in said looped surrounding wall, and an intermediate neck portion interconnecting said first and second operating end portions and extending through said through hole in said connecting seat, said intermediate neck portion being formed with a cam surface biased to contact said follower portion of said connecting seat, said cam surface having a first positioning portion, and a second positioning portion nearer to said base of said connecting seat than said first positioning portion;

a supporting member having an inserting end portion inserted into one end of said sleeve of said suction device distal from the supporting surface, and a connecting end portion opposite to said inserting end portion; and a mounting unit connected to said connecting end portion of said supporting member and adapted for mounting the electronic device thereon;

wherein said operating block is operable so as to move relative to said sleeve between a non-sucking position, where said follower portion of said connecting seat engages said second positioning portion of said cam surface of said intermediate neck portion of said operating block, and a sucking position, where said follower portion of said connecting seat engages said first positioning portion of said cam surface of said intermediate neck portion of said operating block such that said connecting seat is pushed by said intermediate neck portion of said operating block to move away from the supporting surface, thereby forming a vacant space between said central portion of said flexible sucking disc and the supporting surface.

7. The supporting device as claimed in claim 6, wherein said operating block has a side distal from said base of said connecting seat and formed with a notch defined by said cam surface, and two opposite lateral side walls flanking said cam surface, said cam surface further having two inclined surface portions, each of which has opposite inner and outer ends, said outer ends of said inclined surface portions being connected respectively to corresponding ends of said first and second positioning portions, said inner ends of said inclined surface portions being interconnected at a position farther away from said base of said connecting seat than said first and second positioning portions.

8. The supporting device as claimed in claim 6, wherein said connecting seat further has a U-shaped frame that has two parallel side frame portions opposite to each other in a second direction perpendicular to the first direction and connected fixedly to said base, and a connecting frame portion interconnecting said side frame portions and serving as said follower portion of said connecting seat, said U-shaped frame cooperating with said base to define said through hole in said connecting seat.

9. The supporting device as claimed in claim 8, wherein:
said connecting seat of said suction device further has a spring-positioning rod extending from said base toward said connecting frame portion of said U-shaped frame and into said through hole in said connecting seat and
said suction device further includes a coil spring disposed in said sleeve and sleeved around said spring-positioning rod, said coil spring having opposite ends abutting respectively against said operating block and said base for biasing said cam surface of said operating block to contact said connecting frame portion of said U-shaped frame.

10. The supporting device as claimed in claim 8, wherein said sleeve is configured with a first inner passage in spatial communication with said openings in said loosed surrounding wall to permit movement of said operating block therein, and a second inner passage orthogonal to and in spatial communication with said first inner passage to permit extension of said connecting frame portion and corresponding end portions of said side frame portions of said U-shaped frame of said connecting seat thereinto.

11. The supporting device as claimed in claim 6, wherein said mounting unit includes:
a connecting member connected to said connecting end portion of said supporting member;
a pivot plate body connected pivotally to said connecting member; and
a mounting plate body connected detachably to said pivot plate body and adapted for mounting the electronic device thereon.

12. The supporting device as claimed in claim 11, wherein:
said connecting member includes
a bowl-shaped first seat body having a convex surface formed with a first protrusion that extends from a center of said convex surface and that is connected fixedly to said connecting end portion of said supporting member, and a concave surface opposite to said convex surface and formed with a second protrusion that extends from a center of said concave surface and that is opposite to said first protrusion, and
a bowl-shaped second seat body disposed in said first seat body and connected to said second protrusion of said first seat body such that an annular mounting space is formed between said first and second seat bodies;
said pivot plate body has a bowl-shaped central portion that is formed with a central opening to permit extension of said second protrusion of said first seat body of said connecting member therethrough and that is disposed rotatably in said annular mounting space and between said first and second seat bodies such that said pivot plate body is pivotable relative to said connecting member about said second protrusion of said first seat body of said connecting member, said pivot plate body further having opposite lateral sides each formed with a plurality of notches, each of which is defined between two adjacent corner portions facing each other; and
said mounting plate body has a first surface facing said pivot plate body and formed with a plurality of corner-engaging members each engaging detachably a corresponding one of said corner portions of said pivot plate body, and a second surface opposite to said first surface and adapted for mounting the electronic device thereon.

13. The supporting device as claimed in claim 12, wherein each of said corner-engaging members has an L-shaped plate portion extending from said first surface of said mounting plate body, and an outer plate portion extending from said L-shaped plate portion and parallel to and spaced apart from said first surface so as to define a corner-receiving space among said L-shaped plate portion, said outer plate portion and said first surface, said corner-receiving spaces in said corner-engaging members receiving respectively corresponding ones of said corner portions of said pivot plate body and being open in a third direction parallel to said first surface such that said corresponding ones of said corner portions of said pivot plate body are movable relative to said mounting plate body in said third direction to thereby separate from said corner-engaging members, respectively, so as to allow removal of said mounting plate body from said pivot plate body.

14. The supporting device as claimed in claim 13, wherein:
said first surface of said mounting plate body is further formed with an engaging groove; and
said pivot plate body has a generally L-shaped resilient operating member formed with a projection engaging detachably said engaging groove in said mounting plate body for preventing separation of said corner-engaging members from said corresponding ones of said corner portions of said pivot plate body, respectively.

15. The supporting device as claimed in claim 12, wherein:
said second protrusion of said first seat body of said connecting member is rectangular in cross section, and has a threaded hole;
said second seat body of said connecting member has a convex surface adjacent to said concave surface of said first seat body and formed with an engaging recess engaging one end of said second protrusion, and a threaded hole aligned with said threaded hole in said second protrusion of said first seat body and in spatial communication with said engaging recess; and
said connecting member further includes a screw fastener engaging said threaded hole in said second seat body and said threaded hole in said second protrusion of said first seat body.

* * * * *